March 24, 1931.  C. L. DAY ET AL  1,798,069
FERTILIZER DISTRIBUTOR
Filed Jan. 9, 1928   2 Sheets-Sheet 1
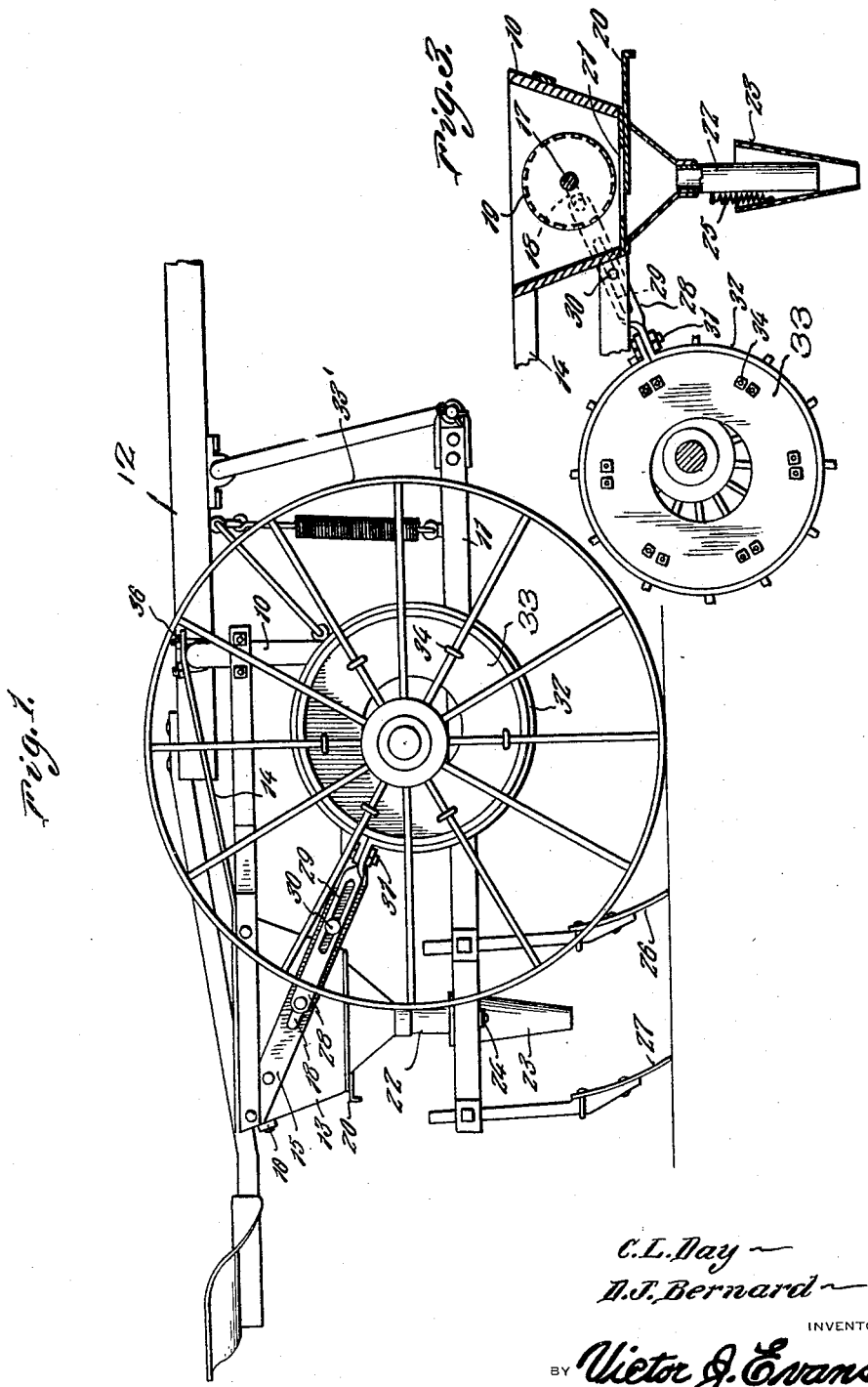
C.L.Day
D.J.Bernard
INVENTORS
BY Victor J. Evans
ATTORNEY March 24, 1931.  C. L. DAY ET AL  1,798,069
FERTILIZER DISTRIBUTOR
Filed Jan. 9, 1928   2 Sheets-Sheet 2
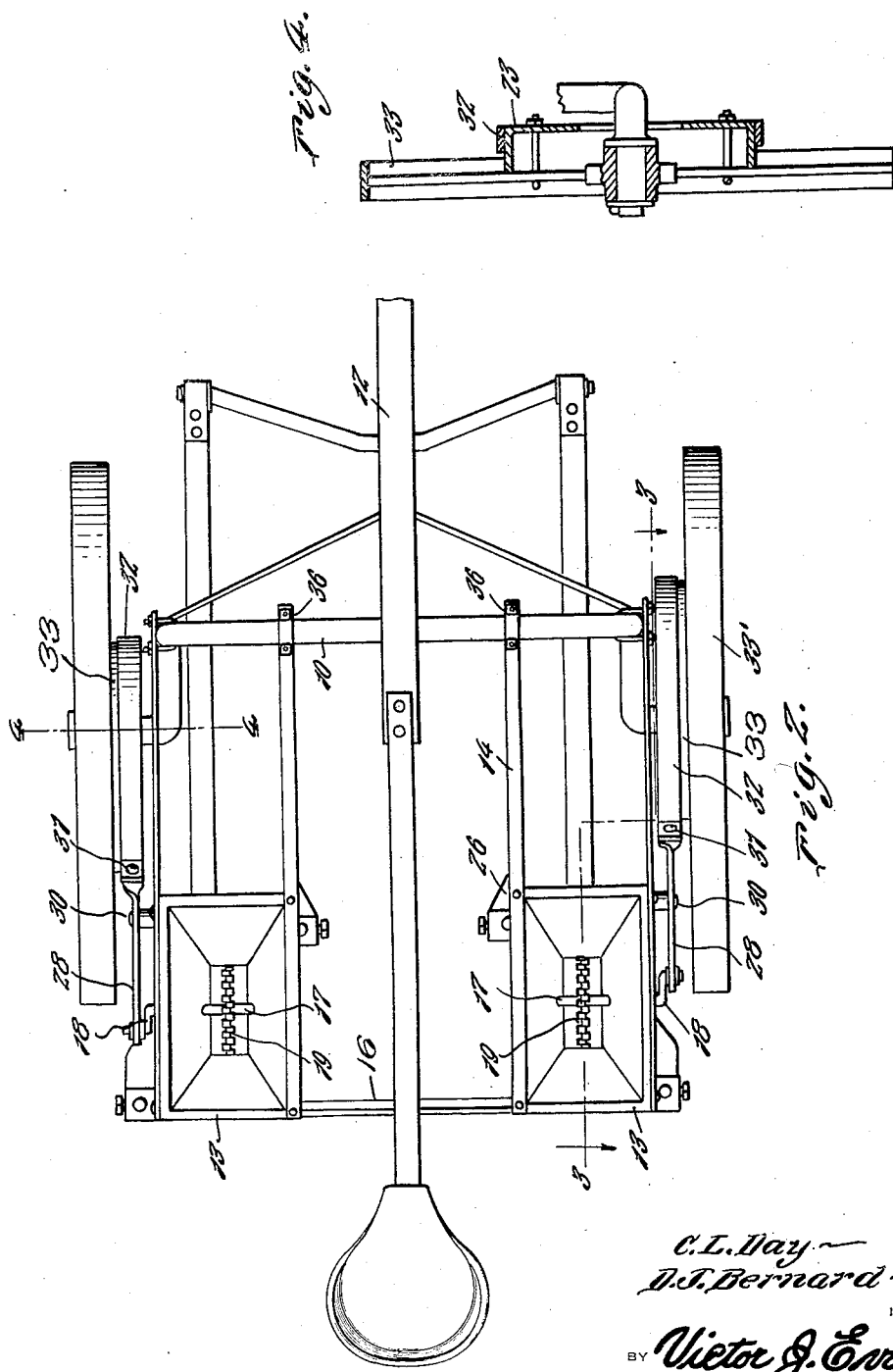

Patented Mar. 24, 1931

1,798,069

UNITED STATES PATENT OFFICE

CARO L. DAY AND DEWEY J. BERNARD, OF PALESTINE, TEXAS

FERTILIZER DISTRIBUTOR

Application filed January 9, 1928. Serial No. 245,607.

This invention relates to improvements in fertilizer distributors and has for an object the provision of a distributor having novel means for operating an agitator, the invention being adapted for application to a riding cultivator or other suitable agricultural machine, as well as for a fertilizer distributor alone.

Another object of the invention is the provision of means for directing the discharge of the fertilizer from the hopper so that the fertilizer may be deposited at the desired place with respect to the plows or shovels of the cultivator, while the fertilizer hopper may move relatively without disturbing the point of discharge.

With the above and other objects in view, the inveniton further includes the following novel features and details of construction, to be hereinafter more fully described, illustrated in the accompanying drawings and pointed out in the appended claim.

In the drawings:—

Figure 1 is a side elevation showing a riding cultivator equipped with the invention.

Figure 2 is a top plan view of the same.

Figure 3 is a section on the line 3—3 of Figure 2.

Figure 4 is a section on the line 4—4 of Figure 2.

Referring to the drawings in detail wherein like characters of reference denote corresponding parts, the invention is shown as applied to a riding cultivator whose frame includes an arch-shaped axle 10, a beam 11, and a tongue 12.

The invention includes one or more hoppers 13 which are connected to the cultivator frame. Two of these hoppers are shown and as the supporting means and the mechanism for operating the hopper agitators, is the same, the description of one hopper and operating mechanism will suffice.

The hopper 10 is secured to the frame by longitudinally extending bars 14 and 15, these bars having one of their ends connected with the hopper and their other ends suitably connected to the cultivator frame, or to the axle 10. Where a number of hoppers are employed, they may be connected by a transverse bar 16.

The bar 15 extends downwardly from the hopper at an incline and the shaft 17 which extends through the hopper, also extends through this bar and is provided at its outer end with a crank arm 18. The shaft 17 has mounted thereon an agitator 19 which operates within the hopper to agitate and stir up the fertilizer. The amount of fertilizer discharged from the hopper is regulated by a slide 20 which is arranged beneath a discharge opening 21 provided in the bottom of the hopper. A spout 22 extends downward from the bottom of the hopper into a funnel-shaped boot 23. This boot is secured to the beam 11 as shown at 24 and the spout 22 is of sufficient length to extend for an appreciable distance into the boot and is connected to the boot by means of a spring 25. This construction permits of relative lateral or vertical movement between the boot and hopper without displacing the spout and permits the fertilizer to be discharged at a proper point between the lead plow 26 and the cover or follower plow 27.

Secured upon the crank arm 18 is one end of a pitman 28. This pitman is provided with an elongated slot 29 through which passes a headed stud or pin 30, the latter being carried by and extending from the beam 15. The lower end of the pitman is connected as shown at 31 to a band 32 and the latter surrounds an eccentric 33 which is secured to one of the wheels 33' which supports the cultivator frame. The eccentrics are secured to the wheels by means of U bolts 34 so as to be removably mounted, while the bars 14 and 15 of the frame are clamped in position as shown at 36, so that these bars also are removably mounted. As the wheels 33' rotate, the eccentrics carried thereby impart a rotary motion to the bands 32, and as the pitmen 28 are slidingly rocked upon the studs 30, the shaft 17 will be rotated through the crank arm connections 18 with the pitmen. The invention may thus be attached to the ordinary riding cultivator, or with slight differences of structure in the attaching means, to some other type of agricultural machine.

The invention is susceptible of various changes in its form, proportions and minor details of construction and the right is herein reserved to make such changes as properly fall within the scope of the appended claim.

Having described the invention what is claimed is:

A fertilizer distributor for cultivators comprising in combination with a cultivator frame, an arch-shaped axle and wheels supported thereon, of a detachable hopper, a bar extending from the top of the hopper and connected therewith and with said axle, a second cooperating bar extending downwardly at an angle to the first mentioned bar, and terminally connected with the frame and said hopper, to assist the first mentioned bar in supporting the hopper, said second mentioned bar having a longitudinal slot therein, means including a crank shaft to agitate the contents of the hopper, with the end of said shaft received by the slot in said bar, a disk eccentrically secured to the adjacent wheel of the cultivator, a band encircling said eccentric, a pitman having one end connected with the band and its other end connected with the said end of the crank shaft, said pitman being longitudinally slotted, and a stud carried by the second mentioned bar and received by the slot of said pitman for the purpose specified.

In testimony whereof we affix our signatures.

CARO L. DAY.
DEWEY J. BERNARD.